United States Patent [19]
Golay

[11] 3,874,428
[45] Apr. 1, 1975

[54] REMOTE FILL SYSTEM FOR L-P GAS CYLINDER

[76] Inventor: Charles R. Golay, Cambridge City, Ind. 47327

[22] Filed: Aug. 8, 1973

[21] Appl. No.: 386,780

[52] U.S. Cl.................. 141/95, 141/302, 141/382, 141/387
[51] Int. Cl............................................. B65b 3/04
[58] Field of Search............ 141/198, 2, 18, 94, 95, 141/280, 382, 387, 388, 389, 302; 222/3, 55; 137/256; 220/85 S

[56] References Cited
UNITED STATES PATENTS

| | | | |
|---|---|---|---|
| 1,897,164 | 2/1933 | Endacott | 222/135 |
| 1,968,141 | 7/1934 | Green | 220/85 S |
| 2,098,119 | 11/1937 | White | 137/517 |
| 2,224,963 | 12/1940 | Hooper et al. | 220/85 S |
| 2,398,828 | 4/1946 | Gray | 141/389 |
| 2,947,330 | 8/1960 | Savage | 141/95 |
| 3,734,115 | 5/1973 | McMath | 137/517 |
| 3,734,149 | 5/1973 | Hansel | 141/95 |

Primary Examiner—Richard E. Aegerter
Assistant Examiner—John W. Shepperd
Attorney, Agent, or Firm—William R. Coffey

[57] ABSTRACT

A remote fill system for an L-P gas cylinder providing a filler valve fitting, a vent valve fitting, and a service valve fitting, the fill system comprising a service box remotely located from the cylinder. The cylinder may be placed, for instance, in a remote location and permanently attached to a recreational vehicle. Then the service box may be placed adjacent a convenient exterior side panel of the vehicle. A filler valve, sight valve, regulator valve, manually-operated service valve, and electrically-operated visual sight gage all may preferably be disposed in the service box. The various valves, in the service box, are connected to their respective fittings on the cylinder by flexible hoses, and the visual sight gage is electrically connected to a volumetric indicating device on the cylinder. Since the flexible hoses might be ruptured or broken, excess flow valves or check valves disposed in the fittings on the cylinder are provided for the flexible hoses, each such valve being effective to prevent the outward flow of gas at least in hazardous volumes if its hose is broken.

1 Claim, 3 Drawing Figures

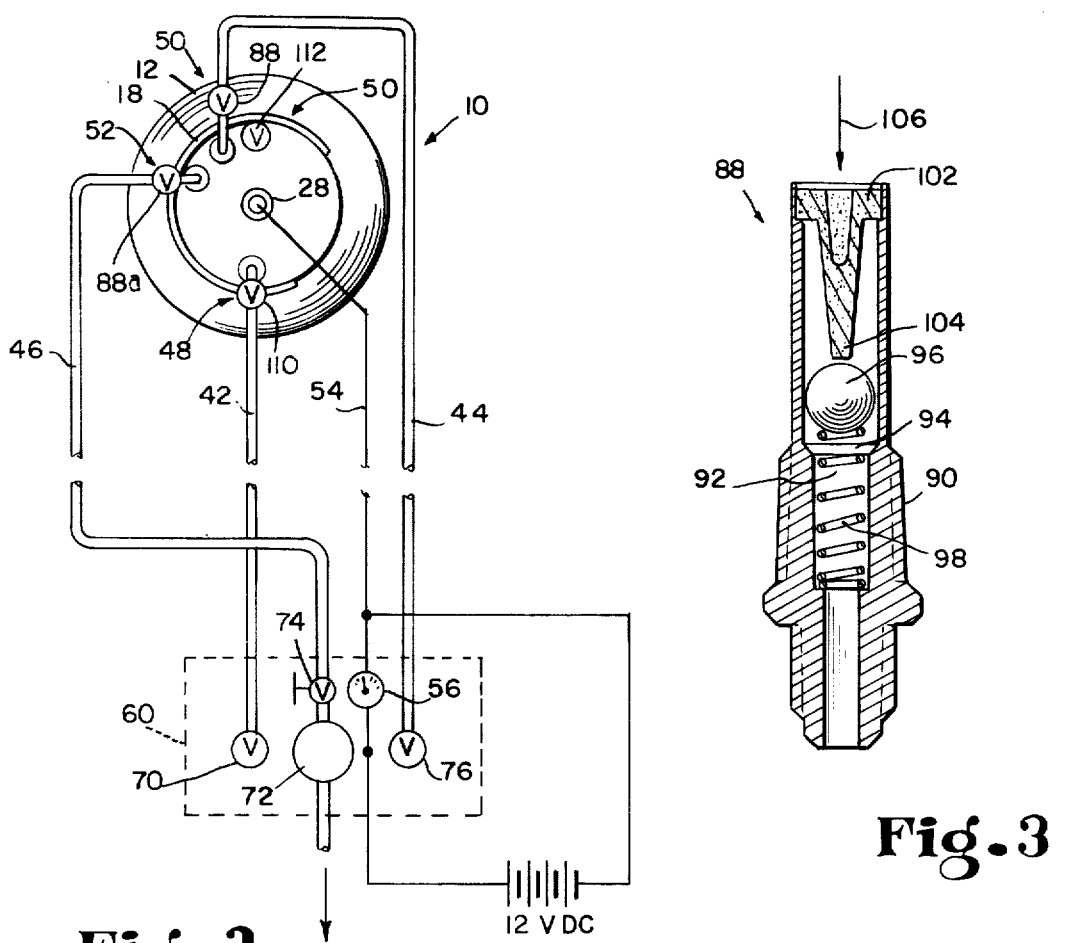
Fig. 2
Fig. 3
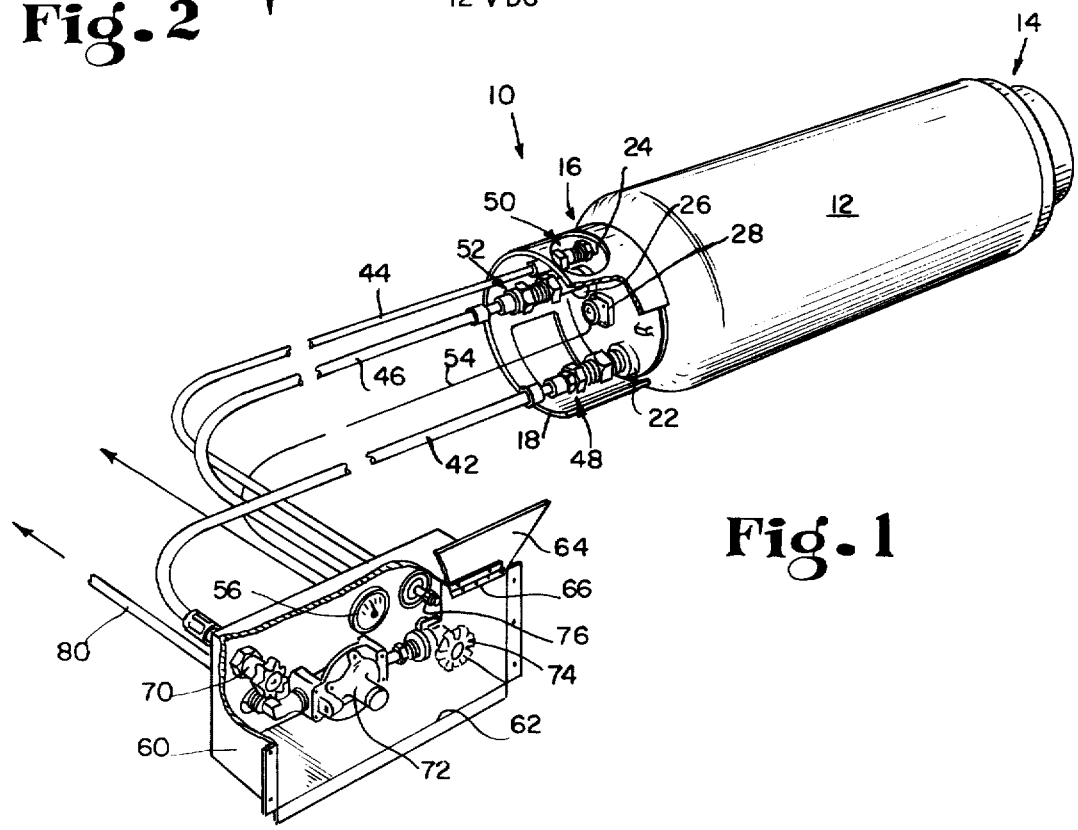
Fig. 1

3,874,428

REMOTE FILL SYSTEM FOR L-P GAS CYLINDER

The present invention relates to L-P gas systems, and particularly to the provision of a system for filling a remotely located L-P gas cylinder or tank which is generally not removable from its location and not relatively accessible.

Presently, L-P gas cylinders must be located on motor homes and recreational vehicles in such a manner that they can be removed and refilled or replaced with filled cylinders. This requirement places a limitation upon the designer of such motor homes and recreational vehicles because the more accessible locations may not always be ideal from a weight balancing basis or other such design basis. Further, a permanently mounted L-P gas cylinder can have a larger capacity than a non-permanently mounted cylinder.

To my knowledge, no one has heretofore suggested a service box remotely located from a permanently mounted L-P gas cylinder with the service box containing filler valves, regulator valves, sight valves, shut-off valves, and the like connected to the cylinder by flexible hoses. Such a system permits placing of the cylinder where the space is available and where its weight will be properly distributed and placement of the service box where the filling operation will be convenient.

In order to prevent the outward flow of gas from the cylinder in hazardous volume levels if one of the flexible hoses breaks, an excess flow valve or check valve is disposed in each cylinder fitting, i.e., the fitting to which each hose is connected. Each excess flow valve includes a body providing a fluid passageway therethrough and a valve seat in the passageway facing the tank or, more specifically, the interior of the tank. A valve member is disposed in the passageway engageable with the seat to close the passageway, and spring means is provided for yieldably urging the valve member away from the seat. The spring means is calibrated to permit the valve member to be moved toward the valve seat by the flow of gas from the tank when the flow rate exceeds a predetermined level. In other words, the excess flow valve associated with each hose or conduit means leading from the service box to the cylinder is calibrated to permit the flow of gas away from the cylinder at an acceptable safe level sufficient, for instance, to run the appliances for which the system is provided. If, during a wreck of the vehicle or by some other calamitous event a hose is ruptured or broken, the excess flow valve for that hose will simply permit the fuel to leak from the tank at a safe rate. The check valves or back pressure check valves, as they are called, permit flow in one direction only, i.e., into the tank.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a fragmentary perspective view, partially cut away, showing the remote fill system of the present invention connected to an L-P gas cylinder with the hoses being broken to indicate that their length may be established as desired;

FIG. 2 is a diagrammatic flow chart showing the service box with the valves and instruments therein connected to the cylinder; and FIG. 3 is a sectional view of an excess flow valve used with the hose leading to the sight valve.

Referring now to the drawings, I show a remote fill system 10 for a tank or cylinder 12. The illustrative cylinder 12 has a base end 14 and a service end 16 with a protective shield 18 conventionally provided about the service end. This cylinder 12 may preferably be of the design presently used as a fuel source for lift truck applications. It should be an L-P gas container manufactured, tested and inspected in accordance with CFR-Title 49 — Part 178. (D.O.T. Specifications for shipping containers.)

The service end 16 of the cylinder 12 is provided with service openings through which communication to the interior of the cylinder is obtained. These openings are conventionally provided with fittings, and the cylinder 12 is provided with a filler valve fitting 22, vent valve fitting 24, service valve fitting 26, and a volumetric indicating device fitting 28. It will be appreciated that such fittings and the manner in which such fittings are provided on L-P gas cylinders is conventional and need not be discussed, in detail, in this description. In this description and in the appended claims, the terms "tank fittings" or "cylinder fittings" are intended to mean the cylinder openings or the fittings secured in such openings. Flexible hoses 42, 44, 46 are connected, respectively, to the fittings 22, 24, 26. In the illustrative and preferred embodiment, the hoses 42, 44, 46 are connected to the cylinder fittings by fitting devices indicated by reference numerals 48, 50, 52, respectively. Preferably, the end fittings for the hoses 42, 44, 46 will be conventional swivel female flare-type fittings of the proper size. The hoses should have a maximum working pressure rating of 350 pounds per square inch gauge expressed as psig. The minimum burst pressure should be 1,750 psig.

For reasons which will be fully explained hereinafter, each cylinder fitting 22, 24, 26 includes an excess flow or check valve positioned directly in the cylinder opening or in the fitting secured in that opening. The above-referred to cylinder fittings 22, 24, 26 may be threaded openings into which are placed such valves which are secured into the openings by the fitting structures 48, 50, 52, respectively.

An electrical service wire 54 connects a volumetric indicating device mounted on the fitting 28 to a conventional meter 56 or an electrically-operated fuel gage. The meter 56 is disposed in a service box 60 which is remotely located from the cylinder 12. The service box 60 may be a rectangularly shaped metal box providing an access opening 62 which is covered by a panel 64 supported on a hinge 66 as illustrated. Inside this service box 60 may preferably be a filler valve 70, regulator valve 72, manual shut-off valve 74, and a sight valve 76. The proximal end of the hose 42 is connected to the filler valve 70 preferably by the same type of swivel fitting used on the ends of the hoses connected to the cylinder 12. The sight valve 76 is similarly connected to the proximal end of the hose 44. Filling of the cylinder 12, therefore, is accomplished by making a connection from the L-P source to the valve 70 and admitting fuel to the cylinder until the fuel starts to appear at the sight valve. The filler valve 70 and sight valve 76 may be conventional and commercially available valves. The sight valve 76 may be, for instance, a REGO No. 3165P vent valve (10% outage) while the filler valve 70 may be REGO No. 7547D filler valve. The manner in which such valves are used to fill L-P gas cylinders is known and need not be discussed, in detail, in this description. Such valves, however, conventionally have been placed upon the service end of the cylinder. It is important to note that the electrical gage or meter 56 is never used as a gage to determine when the cylinder 12 is properly filled. That meter is used properly only as a check on the amount of fuel in the cylinder 12.

The service valve or shut-off valve 74 serves to connect the hose 46 to the conventional regulator valve 72 from which a fuel line 80 extends. This fuel line 80 may be connected to the appliances serviced by the fuel system. The valve 74 may be closed, of course, to stop the flow of fuel to the appliances.

Since the cylinder 12 may be and preferably will be permanently mounted, for instance, in a recreational vehicle at a point remote from the service box 60, and since there is a possibility that one of the hoses 42, 44, 46 will be ruptured or broken in an accident or by accident, an excess flow valve of the type indicated generally by the reference numeral 88 in FIG. 3 may preferably be placed in each fitting 24 and 26. The valve 88 includes a body 90 providing a fluid flow passageway 92 extending longitudinally therethrough and defining a valve seat 94 facing the interior of the cylinder 12. A valve member 96, which conventionally may be a ball as illustrated, is disposed in this passageway 92 to move into engagement with the valve seat 94. Spring means 98 which may conventionally be a coiled compression spring is provided for yieldably urging the valve member 96 away from the seat 94. Then, a retainer 102 is pressed into the inner end (upper end FIG. 3) of the body to close the passageway and to provide a nose 104 extending axially outwardly to keep the ball 96 from moving more than a predetermined distance away from the seat 94. This retainer 102 may be made of a porous metallic material to serve as a filter through which the gas flows.

The spring 98 is calibrated to keep the ball 96 away from the seat 94 as long as the flow of fuel in the direction of the arrow 106 does not exceed a predetermined flow rate. If that flow rate exceeds a level which would produce a hazardous volume flow, the spring 98 will permit the ball to move closer to the seat 94 to reduce or stop the flow. In other words, each excess flow valve is effective to prevent the outward flow of gas from the cylinder 12 in hazardous volume if its associated hose is broken or ruptured. The spring 98, of course, is calibrated such that a sufficient amount of fuel to serve the appliances can flow through the hose 46 to the pressure regulator valve 72 and through that valve to the service line 80.

Turning now to the diagram of FIG. 2, it will be seen that such a valve 88 is illustrated as being associated with the hose 44 leading to the sight valve 76. Another type of conventional and commercially available excess flow valve indicated at 88a is illustrated as being associated with the hose 46 leading to the regulator valve 72. The valve 88a may be, for instance, a REGO 12472 series excess flow valve. A conventional and commercially available back flow check valve 110 is illustrated as being associated with the hose 42 leading to the filler valve 70. Finally, there is illustrated the conventional safety relief valve 112 in its normal 12:00 o'clock position.

I claim:

1. A fuel source comprising an L-P gas tank providing a filler valve fitting, a vent valve fitting, and a service valve fitting, and, in combination with said tank, a fill system comprising a service box remotely located from said tank, a filler valve disposed in said box, first elongated conduit means for connecting said filler valve to said filler valve fitting, a sight valve disposed in said box, second elongated conduit means for connecting said sight valve to said vent valve fitting, whereby said tank can be filled through said filler valve to the proper level by observing said sight valve and stopping the gas flow to said filler valve when gas appears at said sight valve, a pressure regulator valve disposed in said box, third elongated conduit means for connecting said regulator valve to said service valve fitting, said tank being provided with a volumetric indicating device, and an electrically-operated visual sight gage disposed in said box and electrically connected to said volumetric indicating device.

* * * * *